United States Patent [19]

M'Sadoques et al.

[11] Patent Number: 4,646,199
[45] Date of Patent: Feb. 24, 1987

[54] ADAPTER FOR MOLDED CASE CIRCUIT BREAKER SUPPORT SADDLE

[75] Inventors: Andre J. M'Sadoques, Southington; John A. Morby, Farmington, both of Conn.

[73] Assignee: General Electric Company, New York, N.Y.

[21] Appl. No.: 802,349

[22] Filed: Nov. 27, 1985

[51] Int. Cl.<sup>4</sup> ............................................. H02B 1/04
[52] U.S. Cl. .................................... 361/353; 361/363
[58] Field of Search ............... 174/148, 149 R, 149 B, 174/156; 200/293-296; 339/198 N, 22 B; 361/346, 353-356, 358, 359, 361, 363, 376

[56] References Cited

U.S. PATENT DOCUMENTS

| 3,278,807 | 2/1963 | Galante et al. | |
|---|---|---|---|
| 4,118,754 | 10/1978 | Duggan | 361/355 |
| 4,167,769 | 9/1979 | Luke et al. | 361/355 |
| 4,251,851 | 2/1981 | Diersing | 361/353 |
| 4,557,047 | 12/1985 | M'Sadoques | 361/353 |

Primary Examiner—G. P. Tolin
Attorney, Agent, or Firm—Richard A. Menelly; Walter C. Bernkopf; Fred Jacob

[57] ABSTRACT

A main circuit breaker adapter is provided in modular form for attachment to a main lug load center or panelboard to convert to a main circuit breaker load center or panelboard. The main breaker is attached to a thermoplastic unitary support having means for mechanically and electrically connecting to one end of a molded plastic circuit breaker support saddle.

9 Claims, 4 Drawing Figures

ADAPTER FOR MOLDED CASE CIRCUIT BREAKER SUPPORT SADDLE

BACKGROUND OF THE INVENTION

U.S. patent application Ser. No. 802,347 filed Nov. 27, 1985 discloses a unitary thermoplastic molded case circuit breaker support saddle for use in load centers and panelboards. The saddle multifunctionally provides for the attachment of the circuit breakers, main bus conductors, branch strap conductors and neutral terminal conductors on a top surface. One end of the saddle is adapted for receiving an extension module whereby load centers and panelboards can be fabricated of various lengths with a minimum of inventoried parts. The opposite end of the saddle includes means integrally formed therein for the attachment of a main circuit breaker adapter module for converting from a main lug to a main circuit breaker load center or panelboard.

The purpose of this invention is to provide such means for converting from main lug load centers and panelboards to main circuit breaker load centers and panelboards both during the manufacturing process as well as by conversion in the field.

SUMMARY OF THE INVENTION

The invention comprises a unitary thermoplastic main circuit breaker adapter module having means integrally formed thereon for supporting at least one molded case main circuit breaker and for mechanically and electrically attaching the circuit breaker to a thermoplastic molded case circuit breaker support saddle. The means include electric terminal connectors extending from an end of the adapter module inboard of slotted support rails. The slots are arranged for snappingly engaging corresponding split posts integrally formed at the main terminal end of the molded case circuit breaker support saddle.

DESCRIPTION OF THE PREFERRED EMBODIMENT

Figure 1:
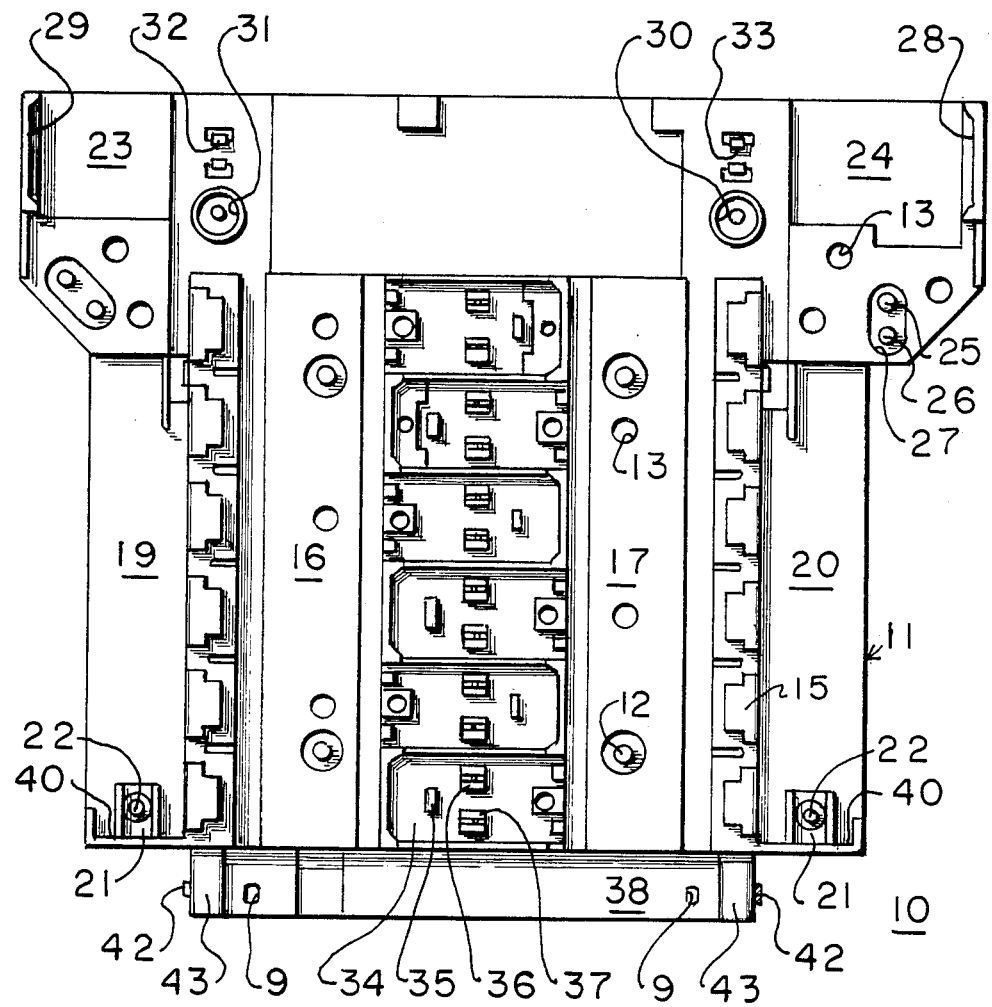
FIG. 1 is a plan view of a thermoplastic molded case circuit breaker support saddle for use with the main circuit breaker adapter module of the invention.
Figure 2:
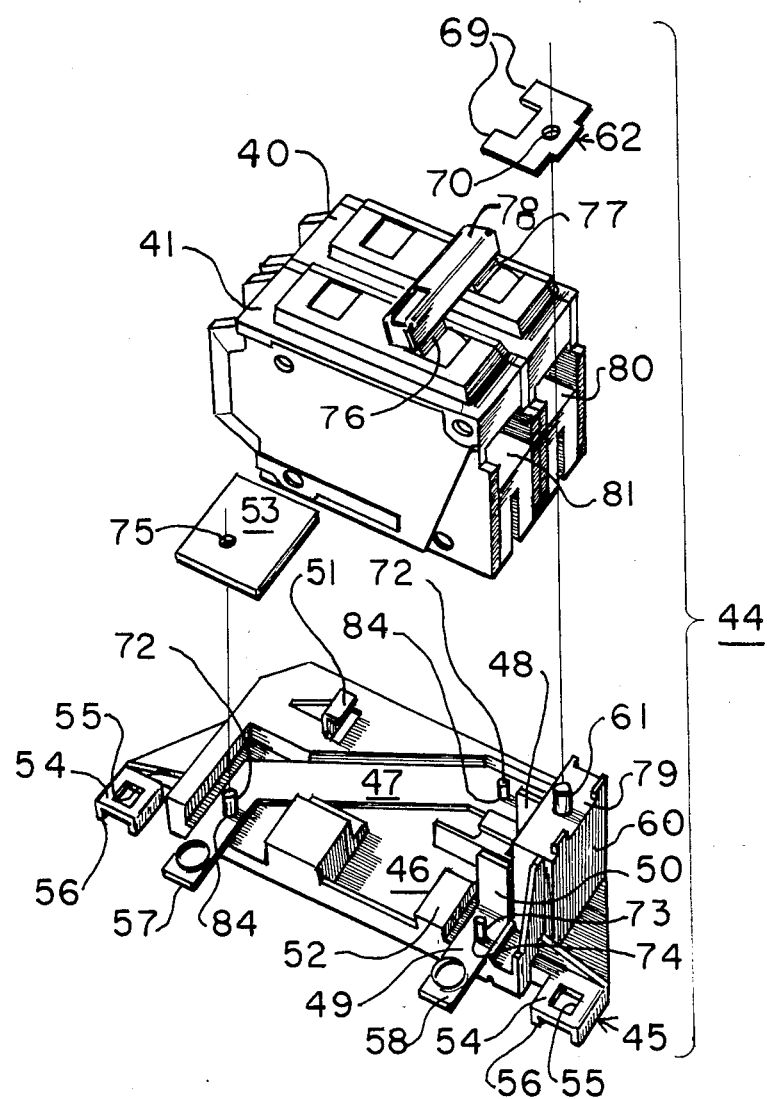
FIG. 2 is a top perspective view in isometric projection of a pair of molded case main circuit breakers prior to attachment to the main circuit breaker adapter module of the instant invention.

A thermoplastic molded circuit breaker support saddle 10 is shown in FIG. 1 to comprise an injection molded support 11 having a plurality of posts 12 and circular recesses 13 formed therein for accommodating the attachment of main circuit breaker busses, hereafter "main busses". A plurality of circuit breaker hooks 15 are integrally formed within the support and extend linearly along the support for retaining the circuit breakers in proximity to planar surfaces 16, 17 formed on the top surface of the support and which further support the main busses and circuit breaker branch strap connectors. Planar surfaces 19, 20 outboard of surfaces 16, 17 serve to support the neutral terminal connectors in combination with a pedestal 21 and a post 22 formed at one end of each of the outer planar surfaces and with a pair of posts 25, 26 formed on oval recesses 27 at opposite ends of each of the outer planar surfaces. Posts 25, 26 can also accommodate an alternate neutral bus terminal conductor when the plastic saddle is used in a "split neutral" load center or panelboard enclosure. A plurality of branch strap support platforms 34 are provided between the planar surfaces 16, 17 and contain posts 36, 37 and a stop 35 to facilitate the robotic assembly of the circuit breaker branch straps as discussed in detail in the aforementioned U.S. patent application. To attach the support 11 to the load center or panelboard support pan or enclosure (not shown) tubular extensions 30, 31 are formed at one end of the support and a pair of slots 9 are formed at an opposite end thereof. A pair of upright barriers 28, 29 at the main terminal end of the support provide electrical insulation between the main terminals and the remaining electrical components within the load center or panelboard enclosure. A pair of projections 42 are formed on one side of each of a pair of inverted U-shaped rails 43 which accommodate the connection of modular extension saddles which are described in the aforementioned U.S. patent application Ser. No. 802,347 entitled "Molded Case Circuit Breaker Modular Support Assembly", which application is incorporated herein for purposes of reference and should be reviewed for a good description of the interconnection between the modular extension saddles and the circuit breaker support saddle. A step 38 is formed at the modular extension connecting end to receive a complimentary end of the modular extension. At the opposite end of the support, hereafter "main lug" end and proximate the tubular extensions 30, 31 are a pair of split posts 32, 33 which are integrally formed in the support for engaging a pair of slots 55 formed within the end of the molded plastic support 45 of the main circuit breaker adapter module 44 depicted in FIG. 2.

Figure 3:
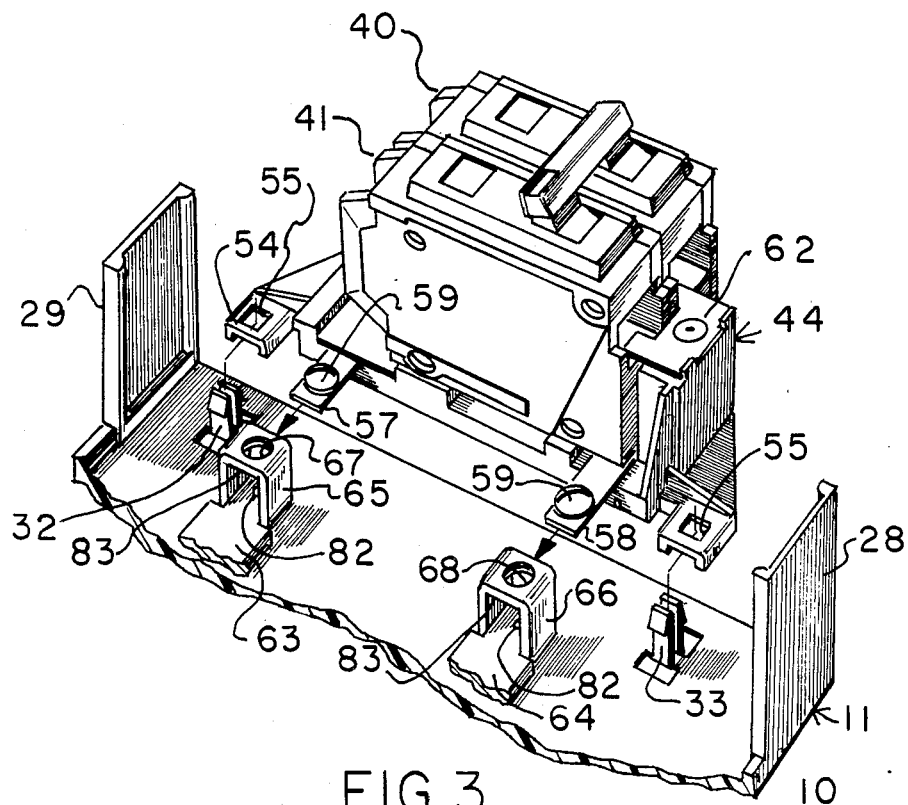
FIG. 3 is a top perspective view in isometric projection of the assembled main circuit breaker adapter module of FIG. 2 prior to connection with the circuit breaker support saddle depicted in FIG. 1.

The main circuit breaker adapter module, hereafter "adapter module" further includes a U-shaped support rail 56 integrally formed on the extensions for providing added support to the adapter module when attached to the main terminal end of the circuit breaker support saddle. A first connector strap 47 having a first circuit breaker stab 48 extending upright from one end and a first terminal end 57 at the opposite end is attached to the top surface 46 of the support by means of a removable plastic cover 53 and a post 72 integrally extending from the support through an opening 75 formed in the cover. Corresponding holes 84 through the first connector strap 47 along with the hole 75 formed in the cover receive the posts 72 which are then ultrasonically formed over to hold the cover and the connector strap rigidly in place. The first connector strap 47 provides electrical connection between the first main circuit breaker 40 when engaged with the first circuit breaker stab 48. A second connector strap 49 having a second circuit breaker stab 50 extending upright from one end and a second terminal 58 at an opposite end is attached to the top surface by arranging an opening 74 in the second connector strap over a post 73 integrally formed in the top surface 46 and ultrasonically forming the post over to capture the strap. A circuit breaker hook 51 integrally formed within the top surface supports both the first and second main circuit breakers 40, 41 at the back end and a pedestal 52 extending from the top surface support the breakers at the front end. To provide common operation for both breakers, their respective handles 76, 77 are fastened together by means of a clip 78 such that both handles move in unison. When the circuit breakers 40, 41 are mounted on the support 45 the steps 80, 81 formed within the front ends of the first and second circuit breakers align with the top surface 79 of the integrally-formed pedestal 60 extending from the top surface of the support. This alignment between the circuit breaker steps and the pedestal top surface allows the attachment of a C-shaped retainer 62 by placing the retainer hole 70 over the post 61 formed on the top surface of the pedestal, aligning the arms 69 of the C over the circuit breaker steps and then ultrasonically forming the post over to capture the retainer. The retainer effectively prevents removal of the circuit breakers from the support and further allows the adapter module 44 when assembled as now seen in FIG. 3, to move as a unitary structure.

The assembled adapter module 44 is attached to the plastic saddle 10 by snappingly engaging the split posts 32, 33 formed on the main terminal end of the saddle support 11 with the slots 55 formed through the adapter module extensions 54. The terminal ends 57, 58 are inserted within the channels 83 formed through the terminal lugs 65, 66 attached to the ends of the main bus conductors 63, 64 and the captive terminal screws 59 are fastened within threaded openings 82 provided at the ends of the main bus conductors. Access to the screws for both attaching and removing the adapter module is made by means of the openings 67, 68 provided through the top of the main terminal lugs after removing the main terminal lug screws as indicated. The ease in the attachment between slots 55 and split posts 32, 33 as well as the arrangement for fastening screws 59 to the threaded openings 82 allow the adapter module 44 to be field-installed as well as installed at the factory on automated equipment, which are important features of this invention. Alternatively, the lugs may be omitted when providing factory-installed main circuit breakers. When the adapter module is attached to the plastic saddle, the upright barriers 28, 29 electrically isolate both the terminals 57, 58 connecting with the circuit breakers 40, 41 as well as the main terminal lugs 65, 66 from the remainder of the load center or panelboard interior.

Figure 4:
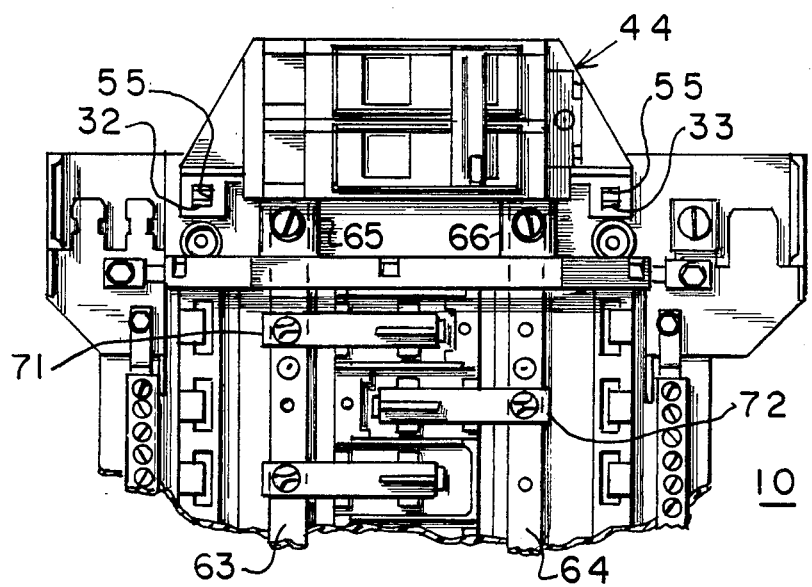
FIG. 4 is a plan view of the main circuit breaker adapter module of the invention attached to the circuit breaker support saddle depicted in FIGS. 1 and 3.

The assembled adapter module 44 on the support saddle 10 is shown in FIG. 4 with the split posts 32, 33 snappingly engaged within the extensions 55 and with the electrical connections made with the main terminal lugs 65 and 66. The main bus conductors 63, 64 are shown electrically connected to the terminal lugs and also include branch straps 71, 72 for facilitating electrical connection with the branch circuit breakers (not shown). It has thus been shown that a plastic circuit breaker support saddle can be used either as a main lug load center or panelboard as well as a main circuit breaker load center or panelboard by means of a modular adapter designed for high speed robotic assembly during the fabrication process as well as for field-installation.

Having described our invention, what I claim as new and desire to secure by Letters Patent is:

1. A plastic molded case main circuit breaker and adapter on a circuit breaker support saddle comprising:
   a plastic circuit breaker support saddle;
   a unitary plastic support on said support saddle said support having a pedestal integrally formed thereon and extending in a vertical direction from a top surface of said support and abuttingly receiving said first main circuit breaker and said pedestal having means providing electrical connection with said first main circuit breaker;
   a pair of plastic slotted attachment means extending from one end of said support and integrally formed with said support and receiving a pair of posts integrally formed on a top surface of said support, said top surface of said pedestal being coextensive with a first step formed on a first side of said first main circuit breaker and connecting said support to one end of said plastic molded case circuit breaker support saddle;
   terminal means extending from said one end of said support in electrical connection with main terminal lugs located on said one end of said circuit breaker support saddles; and
   retainer means attached to a post on said pedestal and having first extension means overlapping said first step formed on said first main circuit breaker one end to prevent said first main circuit breaker from being removed from said support.

2. The plastic molded case main circuit breaker and adapter on the circuit breaker support saddle of claim 1 including a second main circuit breaker mounted on said support and having a second step formed on a first side of said second main circuit breaker, said retainer means having second extension means overlapping a second step formed on said second main circuit breaker one end to prevent said second main circuit breaker from being removed from said support.

3. The plastic molded case main circuit breaker and adapter for circuit breaker support saddles of claim 2 including clip means fitted over first and second operating handles on said first and second main circuit breakers to cause said first and second handles to move in unison.

4. The plastic molded case main circuit breaker and adapter for circuit breaker support saddles of claim 1 wherein said means for receiving said first main circuit breaker comprises a first hook integrally formed said top surface of said support.

5. The plastic molded case main circuit breaker and adapter for circuit breaker support saddles of claim 1 wherein said attachment means comprise a pair of plastic inverted U-shaped pieces having a slot formed in a top surface of each of said U-shaped pieces.

6. The plastic molded case main circuit breaker and adapter for circuit breaker support saddles of claim 1 wherein said terminal means comprises electrical straps extending from said one end of said support and having fastening means on one end of each of said straps for threadingly engaging said main terminal lugs.

7. The plastic molded case main circuit breaker and adapter for circuit breaker support saddles of claim 6 wherein said terminal means each further include a circuit breaker stab extending vertically from said top surface of said support.

8. The plastic molded case main circuit breaker and adapter for circuit breaker support saddles of claim 6 further including means defining an opening through said electrical straps which engages a corresponding post integrally formed within said support and fastening said electrical straps to said posts.

9. The plastic molded case main circuit breaker and adapter on the circuit breaker support saddle of claim 5 wherein said slot in each of said plastic inverted U-shaped pieces snappingly engages a corresponding split post integrally formed on said one end of said plastic circuit breaking support saddle.

* * * * *